United States Patent

[11] 3,631,891

[72] Inventor: Richard S. Brumm
Orinda, Calif.
[21] Appl. No. 14,390
[22] Filed Feb. 26, 1970
[45] Patented Jan. 4, 1972
[73] Assignee: Grove Valve and Regulator Company
Oakland, Calif.

[54] SILENT VALVE
4 Claims, 3 Drawing Figs.

[52] U.S. Cl. .................................................. 137/625.3,
137/625.38
[51] Int. Cl. ...................................................... F16k 1/52,
F16k 3/26
[50] Field of Search .......................................... 137/625.3,
625.38, 625.37; 251/127; 138/43

[56] References Cited
UNITED STATES PATENTS

| 3,514,074 | 5/1970 | Self | 251/127 |
| 3,042,078 | 7/1962 | Rosell | 137/625.3 |
| 2,657,712 | 11/1953 | Huston | 138/43 |
| 2,887,129 | 5/1959 | Stear | 138/43 |
| 2,857,927 | 10/1958 | Pardee | 138/43 X |

Primary Examiner—Arnold Rosenthal
Attorney—Melvin R. Stidham

ABSTRACT: A silent valve with tubular, axially operated valve closure plug. An outlet passage is radially outward of the closure plug, and intermediate it and the closure plug is a stacked series of flat annular discs, formed alternately of porous material and of imperforate material. The imperforate discs confine the flow through the porous discs primarily to radially outward directions. The inner surfaces of the porous discs are uncovered progressively as the closure plug moves toward open position.

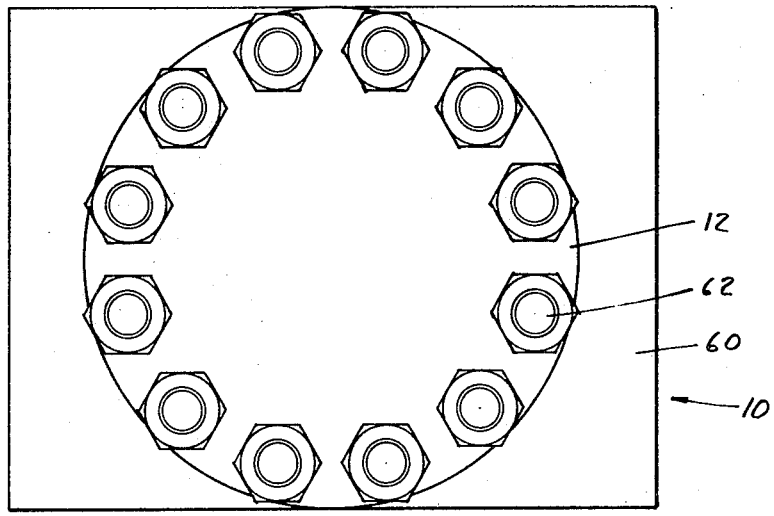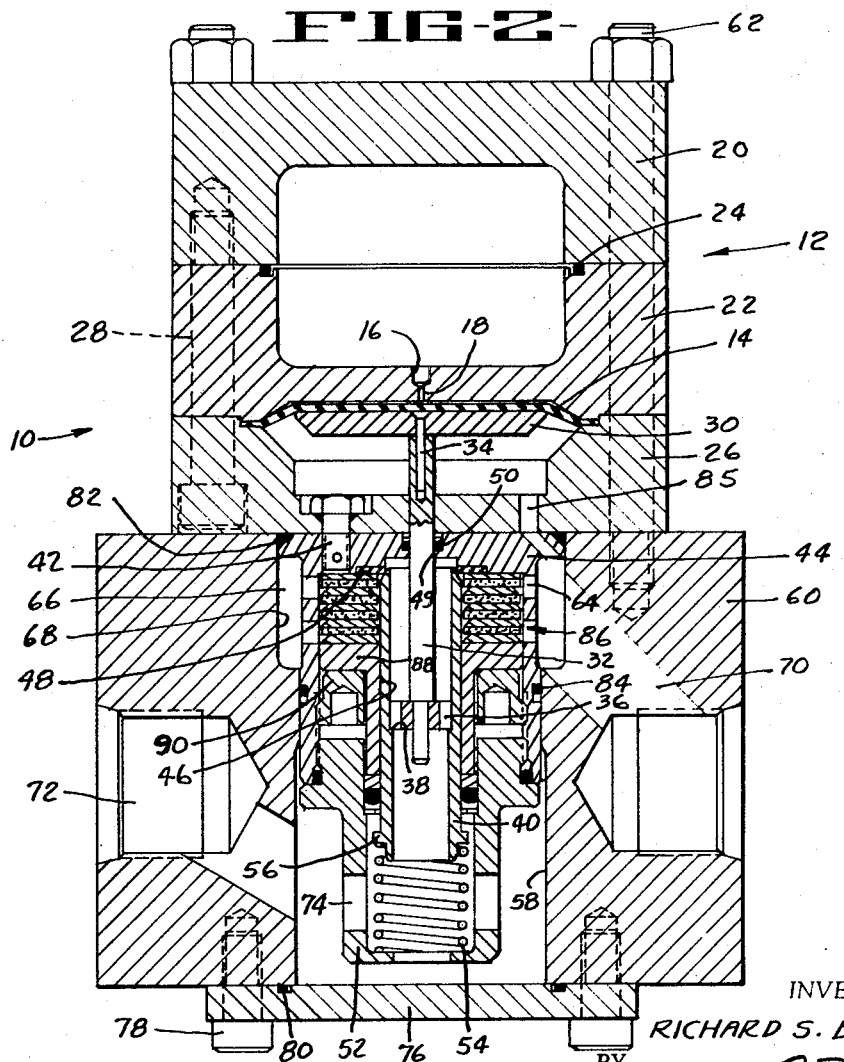

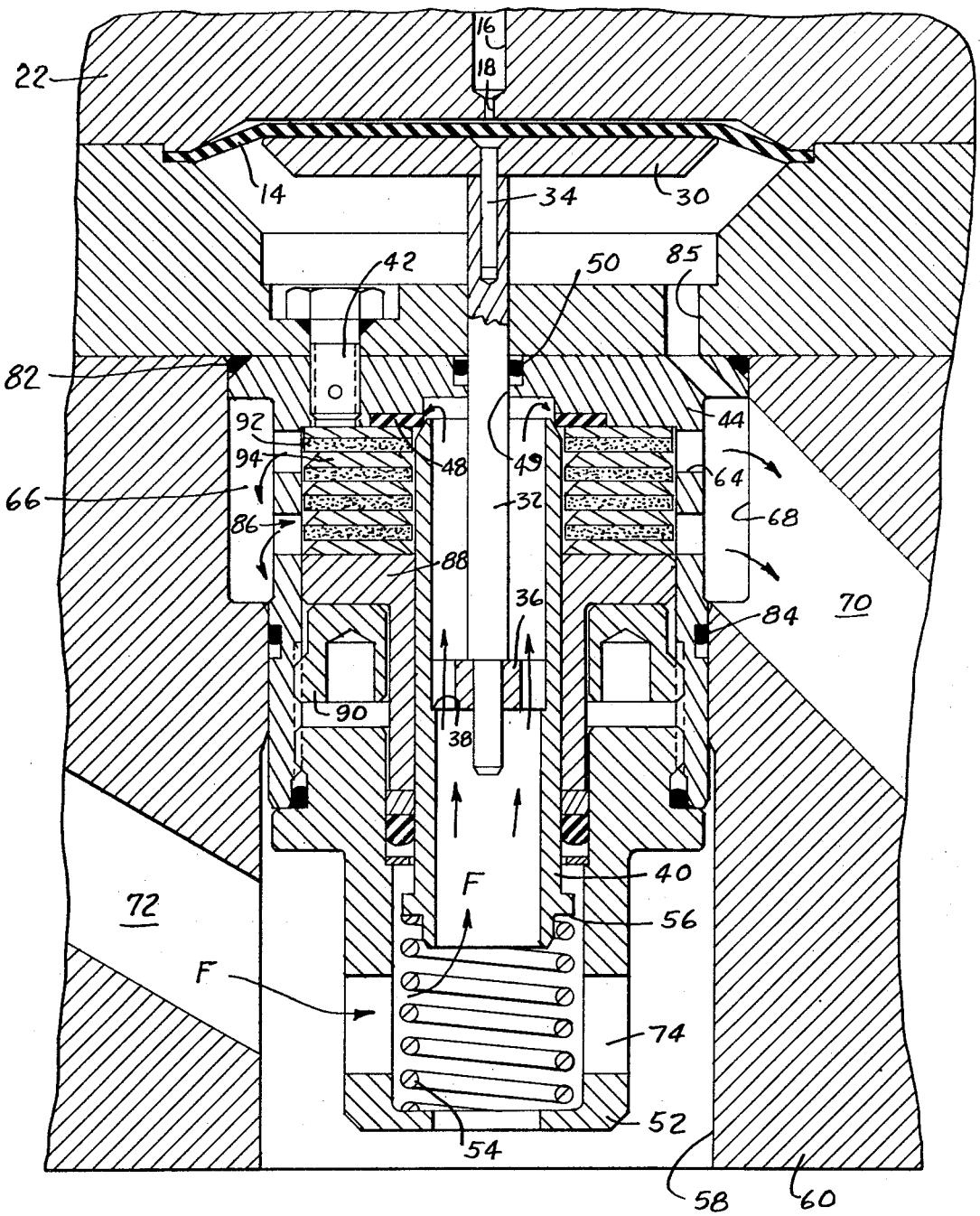
FIG-3-
INVENTOR.
RICHARD S. BRUMM
BY Melvin R. Stidham
ATTORNEY

3,631,891

SILENT VALVE

BACKGROUND OF THE INVENTION

This invention relates to a silent valve, and more particularly, to a valve provided with means for greatly retarding the velocity of fluid flow through it when the valve is open.

Fluid flowing at high velocity, as through a valve generates an objectionably high noise level. In addition, high velocity fluid flow through the valve is likely to cause erosion, particularly if vapor or oil droplets are entrained in the fluid stream.

It is, therefore, an object of this invention to provide a valve structure with means for greatly retarding the velocity of fluid flow therethrough.

It is a further object of this invention to provide means for retarding fluid flow with progressively increasing flow capacity as the valve moves toward full open position.

BRIEF DESCRIPTION OF THE INVENTION

In carrying out this invention, a central inlet flow port is closed by a tubular, axially operated valve closure plug engaging a seat around the port. A valve operating stem is moved in one direction to open the valve and a spring biases the valve into closed position. One or more outlet passage is located radially outward of the valve closure plug in spaced relationship thereto, and embracing the valve closure plug is a stacked series of alternately arranged porous and imperforate annular discs. Hence, as the inner edge of each porous disc is uncovered by the valve closure plug during opening movement, flow is confined by the adjacent imperforate discs into radially outward directions through each porous disc. One or both of the inner and outer edges of each imperforate disc may be relieved or chamfered to expose the adjacent edges of a porous disc to the fluid stream.

BRIEF DESCRIPTION OF THE DRAWINGS

FIG. 1 is a vertical section view of a fluid pressure regulator incorporating features of this invention;

FIG. 2 is a top view of the regulator; and

FIG. 3 is an enlarged partial section view of a portion of the valve showing velocity retarding discs.

DESCRIPTION OF A PREFERRED EMBODIMENT

Referring now more particularly to FIG. 1, this invention may, by way of example, be incorporated into a pressure fluid regulator 10 having a dome loading chamber 12 the loading pressure of which is exposed to a diaphragm 14 by means of a loading passage 16 opening into an orifice 18. The dome 12 may be formed in two sections 20 and 22 with the joint between them sealed off, as by means of an O-ring 24. A mounting plate 26 clamps the edges of the diaphragm 14 to the lower dome section 22, sealing between them, with the three sections being secured together as by means of cap screws 28.

A diaphragm back-up plate 30 supports the diaphragm and operates to depress a valve operating rod 32 through a sliding pin connection 34. The operating rod 32 transmits motion through a spider 36 carried on a shoulder 38 within the tubular valve closure plug 40.

Secured to the lower mounting plate 26 as by means of cap screws 42 is a subhousing 44 having a central bore 46 for the tubular valve closure plug 40 around the upper end of which is mounted a valve seat 48 preferably of elastomeric or plastic material. A bore 49 at the upper end of the subhousing 44 slideably receives the valve operating rod 32, with an O-ring 50 sealing around the rod 32. A spring retainer sleeve 52 threadedly received in the lower end of the subhousing 44 compresses a coil spring 54 against a radial flange 56 on the tubular closure plug 40 to bias it toward the seat 48. The subhousing 44 is received in a bore 58 in a main body block 60 and the whole assembly is secured in place by suitable bolts 62. A series of outlet ports 64 open around the subhousing into an annular outlet passage 66 formed by a counter bore 68 in the main body block 60, the outlet passage 66 opening into an outlet 70 in the main body block 60. Similarly, a body block inlet 72 opens into the bore and communicates with the interior of the tubular closure plug through inlet ports 74 in the spring retainer sleeve. A plate 76 secured to the body block by cap screws 78 and sealed at 80, closes off the bore 58 at the bottom. Seal rings 82 around the top of the subhousing 44 seal the outlet against leakage and an intermediate seal ring 84 isolates the inlet and outlet passage 72 and 66. A sensing port 85 opens through the mounting plate 26 to expose the underside of the diaphragm 14 to outlet pressure.

Embracing the tubular closure plug 44 is a stacked series 86 of discs which will hereinafter be described in greater detail. The stacked discs 86 are mounted on a pressure ring 88 which compresses the stack 86 under force of an annular member 90 threaded into the subhousing 44.

In assembly of the valve 10, the stack of discs 86 is inserted into the subhousing 44 and clamped to the desired compression by threading the inner pressure ring 90. Then, the tubular closure plug 44 is inserted within the bore 46 and with the spring 54 placed, the spring retainer ring 52 is also threaded into the subhousing 44.

The diaphragm backing plate 30 and valve operating rod 32 are placed and the lower mounting plate is secured to the subhousing by tightening the cap screws 42. Thereafter, the diaphragm 14 is positioned as shown, and the mounting plate secured to the dome assembly 12 by means of the intermediate cap screws 28. Finally, the entire assembly is inserted into the bore 58 and mounted on the main body block by tightening the bolts 62.

Referring now more particularly to FIG. 3, the stack 86 of annular discs comprises a series of alternately arranged porous discs 92 and imperforate separator discs 94. The porous discs may be made of a sintered metal, and preferably a sintered material of metal fibers, which provide multitudinous microscopic tortuous flow paths. The imperforate separator discs 94 on both sides of each porous disc 92 confine flow to radial directions through the porous disc from the end of the tubular valve closure plug 40 to the outlet ports 64. The cross sectioned area of the porous discs 92 increases progressively toward the radially outer ports thereof, to provide gradually increased flow capacity, compensating for gas expansion.

Each pair of separator discs may confine outward flow to one porous disc so that as the tubular closure plug 40 opens further, more and more porous discs 92 become uncovered for increased flow capacity. Particularly because machining of the sintered materials tends to seal its surfaces one or both of the inner and outer edges of the imperforate separator discs may be relieved or chamfered at 96 and 98 access to and from a planar surface of an adjacent porous disc 92 along its inner and outer edges, respectively.

In operation, the tubular closure plug 40 is normally biased by the spring 54 into the closed position shown in FIG. 2. However, when the spring force is overcome by the pressure loaded into the dome 12 from a suitable source (not shown) the closure plug 40 is moved away from the seat 48 permitting a flow of fluid in the direction of the arrows F. As the closure plug moves toward full open position, it gradually uncovers more and more porous discs with the result that flow capacity is increased. In addition, the flow capacity of each porous disc is increased as the gas flows toward the outer circumference simply by reason of the larger cross section with increase in circumference. The multitudinous tortuous flow paths through the porous discs greatly retard the flow of the gas preventing high velocity flow and producing silent operation.

While this invention has been described in conjunction with a preferred embodiment thereof, it is obvious that modifications and changes therein may be made by those skilled in the art without departing from the spirit and scope of this invention.

What is claimed is:

1. In a valve structure comprising:

a body having an inlet port, an axially movable tubular valve closure member in said body, an outlet passageway in said body radially outward of said closure member and in spaced relationship thereto, the improvement comprising:

a relatively thick porous annular member in said body and embracing said valve closure member, an inner surface of said annular member being progressively uncovered by said valve closure member during opening movement thereof, a valve-operating stem movable in one direction to move said valve closure member into open position, resilient means biasing said valve closure member in the opposite direction, and an inlet flow passage displaced from said annular members in said one direction and opening into communication with the interior of said valve closure member.

2. The valve structure defined by claim 1 wherein said annular member comprises:

a plurality of thin flat annular members of porous material stacked in said body, a series of flat imperforate rings arranged alternately with said porous members for restricting flow through said annular members to radially outward directions, the inner edges of said flat rings being formed to slidably guide said closure member but to expose portions of the flat surfaces of said porous members along the adjacent edges thereof.

3. The valve structure defined by claim 2 wherein:

said inner edges of the imperforate members are chamfered.

4. The valve structure defined by claim 2 including means for compressing the stack of porous members and imperforate rings.

* * * * *